UNITED STATES PATENT OFFICE.

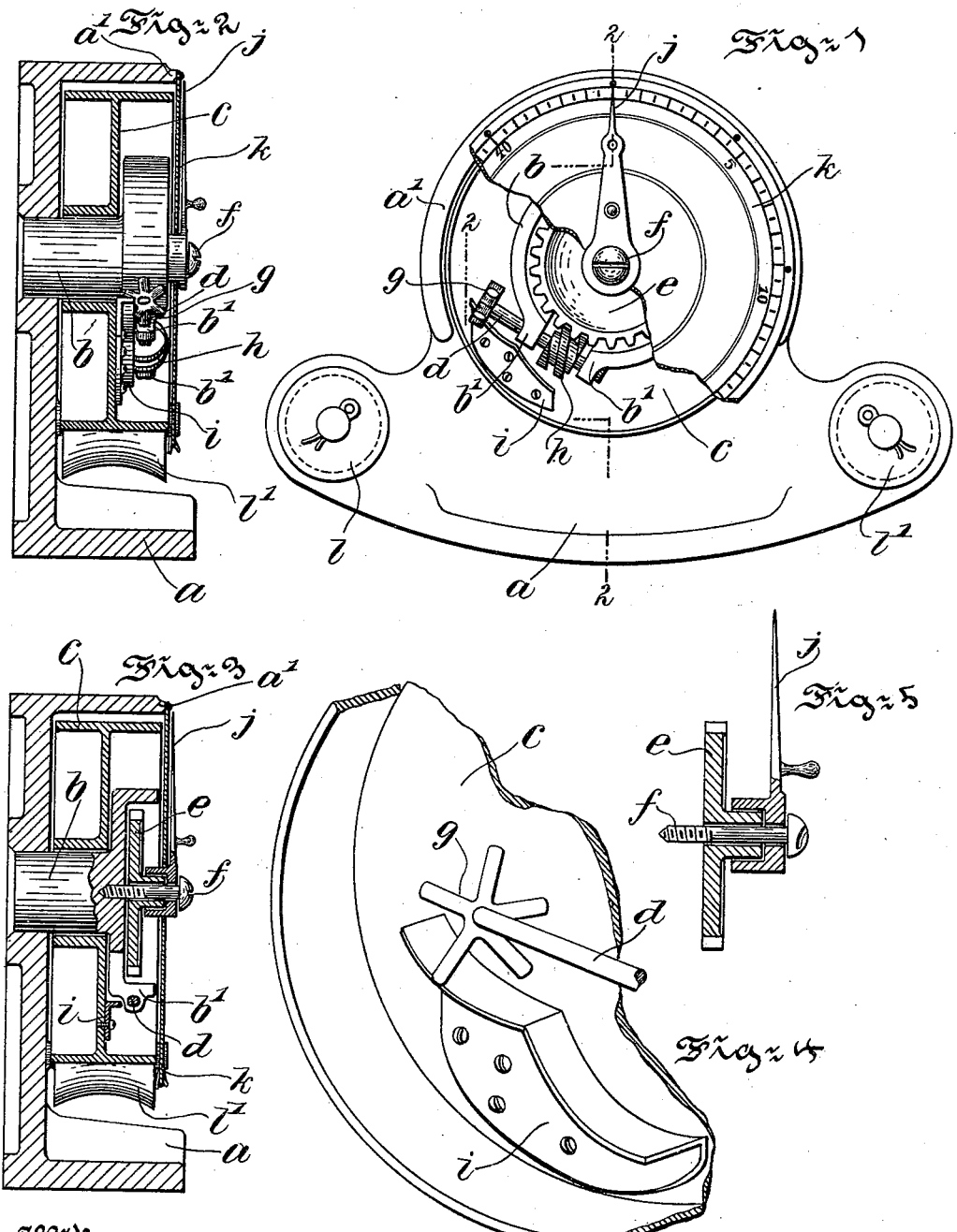

GEORGE F. HOFFMAN, OF PHILADELPHIA, PENNSYLVANIA.

ROPE-MEASURING MACHINE.

SPECIFICATION forming part of Letters Patent No. 566,909, dated September 1, 1896.

Application filed October 8, 1895. Serial No. 565,049. (No model.)

*To all whom it may concern:*

Be it known that I, GEORGE F. HOFFMAN, a citizen of the United States, residing at the city of Philadelphia, in the county of Philadelphia and State of Pennsylvania, have invented certain new and useful Improvements in Rope-Measuring Machines, of which the following is a specification.

The principal object of my present invention is to provide a simple, comparatively inexpensive, accurate, and durable machine for easily and rapidly measuring ropes of various diameters, and which may be conveniently held in the hand or attached to a suitable support; and to this end my invention consists in the improvements hereinafter described and claimed.

The nature, characteristic features, and scope of my invention will be more fully understood from the following description, taken in connection with the accompanying drawings, forming part hereof, and in which—

Figure 1 is a front view of a machine embodying features of my invention and showing a portion of the dial thereof broken away in order to expose the interior parts to view. Fig. 2 is a sectional view taken on the line 2 2 of Fig. 1. Fig. 3 is a similar view taken through the center of Fig. 1, and Figs. 4 and 5 are views drawn to an enlarged scale and illustrating details of construction.

In the drawings, $a$ is a frame that may be held in the hand or secured to a suitable support.

$b$ is a stud or post secured to the frame $a$, and, as shown in the drawings, adapted to serve as an axle or bearing upon which a contact-wheel $c$ is free to revolve. The head of this post $b$ is provided with lugs $b'$, that constitute bearings for a counter-shaft $d$, and with a suitable space for the accommodation of the worm-wheel $e$, which is rotatably mounted on a screw or arbor $f$, carried by the post $b$. The counter-shaft $d$ is provided with a star or pin wheel $g$ and with a worm $h$, meshing with the worm-wheel $e$. The contact-wheel $c$ is provided with a projection or cam-surface $i$, which operates upon the teeth or projections of the wheel $g$ so as to turn it a distance corresponding with the space between its teeth at each revolution of the wheel $c$. The worm-wheel $e$ is provided with a pointer $j$, that has frictional connection with it, so that the pointer $j$ may be moved manually while the wheel $e$ remains at rest.

$k$ is a dial that may be carried by a suitable projection, as $a'$, cast or otherwise formed on the frame $a$.

$l$ and $l'$ are guide-rollers mounted so as to turn in respect to the frame $a$.

The mode of operation of my improved machine may be described as follows: The rope to be measured is passed over the guide-rollers $l\ l'$ and under the friction-wheel $c$, which may be readily accomplished because the dial does not extend to the bottom of the frame, as shown in Figs. 1 to 3, whereby a space or opening is provided into which the rope may be laid. These guide-rollers insure good frictional contact between the rope and the periphery of the contact-wheel $c$, even when ropes of different diameters are to be measured. Moreover, the rope may be readily placed in this position because the lower portion of the front of the device is open, as has been already stated. The rope is then pulled in the direction of its length and of course imparts rotary motion to the contact-wheel $c$. Each revolution of the wheel $c$ causes the cam $i$ to operate upon the star or pin wheel $g$ and turn it a distance corresponding with one of the spaces between its teeth. This motion of the star-wheel $g$ imparts rotary motion to the worm $h$, and the latter turns the worm-wheel $e$ and pointer $j$, it being understood that the pointer $j$ has frictional engagement with the worm-wheel $e$. The divisions upon the dial $k$ and the relative motions transmitted by the various parts $c, i, g, d, h$, and $e$ are such that when one foot or other unit of length of rope has been drawn in contact with the periphery of the wheel $c$ the pointer $j$ has traversed one division of the dial. Consequently in use the rope is drawn along in the direction of its length until the pointer $j$ indicates upon the dial the number of feet required, whereupon the rope is cut off and the pointer $j$ is returned manually to its initial position, it being understood that the friction existing between the nested shank of the pointer and the hub of the wheel $e$ is for this purpose overcome.

It will be obvious to those skilled in the art to which my invention appertains that modifications may be made in details without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

1. In a rope-measuring machine the combination of, a frame, a rotatable contact-wheel and a dial and a pointer and driving mechanism between said wheel and pointer disposed at and carried by one part of the face of said frame, and rotatable guide-rollers attached to the other part of the face of said frame and disposed at a distance from said dial and contact-wheel to afford an open space between the wheel and guide-rollers into which a rope may be laid, substantially as described.

2. In a rope-measuring machine the combination of, a frame having a contact-wheel and its complemental indicating mechanism applied to the face thereof, with, guide-rollers mounted on the face of said frame and disposed at a distance from the contact-wheel to afford an open space into which ropes of different diameters may be laid and guided against the contact-wheel, substantially as described.

3. In a rope-measuring machine the combination of, a frame, a dial secured to the upper part of said frame, a rotatable contact-wheel beneath said dial, rotatable guide-rollers carried by the frame and disposed at a distance from said dial and contact-wheel to permit a rope to be laid between said wheel and guide-rollers, a worm-wheel, a pointer driven by said worm-wheel, a counter-shaft provided with a worm and a star or pin wheel, and a cam or projection carried by said contact-wheel and adapted to drive the star or pin wheel, substantially as described.

In testimony whereof I have hereunto signed my name.

GEORGE F. HOFFMAN.

In presence of—
 A. B. STOUGHTON,
 W. J. JACKSON.